United States Patent Office 3,746,526
Patented July 17, 1973

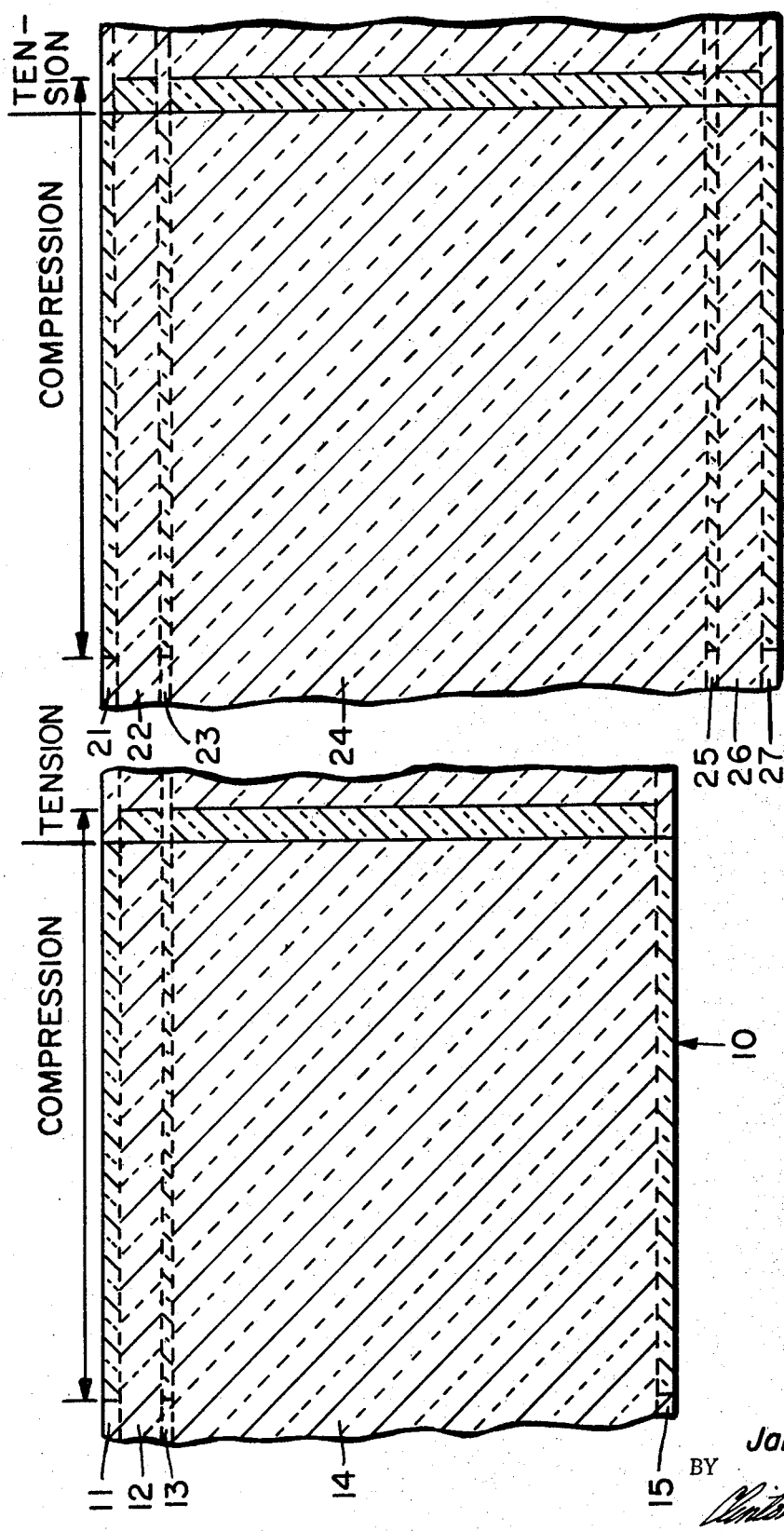

3,746,526
METHOD FOR FORMING SUBSURFACE
FORTIFIED LAMINATES
James W. Giffon, Corning, N.Y., assignor to Corning
Glass Works, Corning, N.Y.
Original application June 6, 1968, Ser. No. 735,115.
Divided and this application Mar. 10, 1971, Ser.
No. 128,612
Int. Cl. C03b 5/26, 5/32
U.S. Cl. 65—121                                      2 Claims

ABSTRACT OF THE DISCLOSURE

This invention relates to high strength glass, glass-ceramic, or glass and glass-ceramic laminates having subsurface fortification whereby a crack resulting from the fracture of an outer compressively stressed layer of the laminate is prevented from propagating throughout the entire cross section of the laminate by a subsurface fortification comprising at least one internal compressively stressed layer.

---

This application is a divisional application based upon Ser. No. 735,115, filed June 6, 1968, now Pat. No. 3,597,-705 issued Aug. 3, 1971.

BACKGROUND OF THE INVENTION

In the past, glass has been thought of as a weak and brittle material. Although glass is a brittle material, it is basically a very strong material, with tensile strengths of more than 100,000 p.s.i. if the surface is free from defects. Ordinary commercial glass under load normally fails in tension at the surface as a result of the surface defects. Therefore, many attempts have been made to strengthen glass products by providing them with a compressively stressed surface.

A mid seventeenth century curiosity known as the Prince Rupert Drop was amongst the first reported strengthened glass products. The basic mechanism, although not known at the time, has since been determined and is now known as tempering. Tempering comprises cooling a glass object so as to establish a temperature gradient therein under conditions where the glass is sufficiently low in viscosity to yield and release temporary stresses. As the object is cooled to room temperature, the temperature gradient originally established disappears and, a state of stress is created with the central section of the object in tension and the outer surface section in compression. This surface compression increases the strength of the product. The degree of strengthening will depend upon the temperature from which the product was cooled, the rate of cooling, the coefficient of thermal expansion, and the elastic properties of the glass.

There are several chemical techniques by which glass articles may be strengthened, all of which are relatively new. One such technique comprises contacting the surface of a sodium or potassium silicate glass article, at a temperature above the strain point of the glass, with an external source of lithium ions. As a result of this contact, the lithium ions in the external source exchange with the sodium or potassium ions in the surface of the glass yielding a surface layer having a lower coefficient of thermal expansion than the parent glass. Thus, when the article is cooled below the strain point of the glass, the higher expansion interior contracts more than the lower expansion exterior leaving the low expansion surface layer in a state of residual compression.

A second chemical strengthening technique has been developed wherein larger potassium ions from a salt bath are exchanged for smaller sodium ions in the glass at temperatures below that at which the glass can flow and relieve the stresses. Therefore, the introduction of the potassium ion into the positions previously occupied by the sodium ion results in a crowding of the surface. This crowding produces a rather high residual compressive stress in the surface with a counterbalancing tensile stress in the interior.

Strengthening by the use of an overlay is also known in the art. An excellent example of this is found in U.S. Pat. No. 2,157,100 wherein the patentee teaches a method of strengthening a ceramic insulator by applying a glaze having a coefficient of thermal expansion approximately 10% less than that of the ceramic body. Upon cooling, the glaze is left in a state of residual compression thereby effectively increasing the strength of the whole body. This technique is well-known and documented throughout the china-body industry, and is the typical method for strengthening dinnerware. Still higher strength bodies have been developed by glazing glass-ceramic articles. Special glazes have been applied to glass-ceramics so that upon maturing, a crystalline interlayer is formed between the glass-ceramic and glaze. This interlayer permits greater differences in the coefficients of thermal expansion and thus higher strength bodies. These glazes and their application to glass-ceramic articles are described in U.S. Pat. No. 3,384,508.

In 1891, Otto Schott made boiler gauge glasses by overlaying a high thermal expansion glass with a low thermal expansion glass. He did this by inserting an iron rod into molten high thermal expansion glass, gathering a gob of this glass on the rod, cooling it slightly, and then inserting it into a second pot of molten low thermal expansion glass. He then drew the composite glass into a rod. Upon cooling, the low expansion exterior glass was left in a state of residual compression, thereby strengthening the composite.

U.S. Pat. No. 1,960,121 teaches a process for forming a strengthened composite glass article wherein the index of refraction of the article is the same throughout. The disclosure in that patent indicates that a method of strengthening glass products by utilizing two or more layers of glasses having different coefficients of thermal expansion is well known in the art. The disclosure also indicates that the relationship between the thickness of the various layers and the coefficients of expansion of the various glass layers is also well known and that the lower expansion layer is always the thinnest of the layers. Furthermore, he teaches that the layers should be united while they are still soft. A British patent, No. 405,918, teaches that it is known to join together two or more laminae of fluid glass having different coefficients of expansion. However, the disclosure indicates that there are problems in cutting and forming of these bodies. Therefore, it suggests that two or more sheets having the required coefficients of expansion be cut in the cold state and then heated to a temperature at which their viscosities will be between $10^8$ and $10^{13}$ poises. Thereafter, the separate sheets can be pressed or rolled together so as to form a laminated sheet. The patentee alleges that by this process, a strengthened laminated sheet wherein no problems of controlling the size and shape thereof can be produced.

From the above references, it is evident that the general concept of producing a strong laminated composite body wherein the layers, are of different coefficients of expansion is well known. However, the art primarily relates to three layer laminates. Although there is peripheral mention of the fact that more than three layers can be used, the disclosures mainly relates to three layer laminates. Three layer laminates are significantly stronger and break-resistant than annealed, or tempered, or chemically strengthened glass articles. However, in a three-layer laminate, a tempered or a chemically strengthened article, the fracture of an outer compressively stressed layer normally results in failure of the entire body. Furthermore, depending upon the internal energy, which is related to the maximum internal tensile stress, failure of those strengthened articles, can be quite violent. Thus, it is desirable to devise structures wherein fracture of the outer compressively stressed surface layer does not result in failure of the entire body and if failure of the entire body does occur, the violence of breakage should be controllable.

Throughout the art there appears to be no consistent definition of parameters necessary to produce laminated bodies. For example, although it is stated that there should be a difference in coefficient of expansion, there are no teachings as to what these differences should be. Similarly, it is stated that there should be differences in thicknesses of the layers but there is no teaching of the thicknesses which are permissible. Neither is there any teaching as to interrelation, if any, between the differences in coefficients of thermal expansion and the thickness of the layers. It is also stated that the glasses should be soft, but there is no disclosure of the viscosities or the temperatures at which such laminates should be formed. Neither is there a statement as to the relationship, if any, between the viscosities of the different layers. Furthermore, there is no teaching in the art as to how to prepare a hot-laminated strengthened glass body. Moreover, there is no teaching of how to prepare such a laminate in a continuous, rather than a batch, process.

The prior art does not teach the stress distributions and magnitudes thereof which will produce a desirable laminated body. The distribution and magnitude of the stresses will determine the strength of the body and the violence of breakage. The only teaching available is U.S. Pat. No. 2,177,336 which relates to tempered glass bodies. However, the conditions in a tempered body are quite different from those which exist in a laminated body.

Therefore, the art teaches little, if anything, with respect to specific parameters which relate to three-layer laminates. Moreover, there are no pertinent teachings with respect to improved articles wherein fracture of the outer compressively stressed layer does not result in failure of the entire body.

SUMMARY OF THE INVENTION

I have invented a subsurface fortified laminated system for the production of laminated glass, glass-ceramic, or glass and glass-ceramic bodies which are relatively inexpensive in composition, readily producible commercially, and do not fail upon the fracture of an outer compressively stressed layer. The basic unit of this invention comprises a laminate wherein the outer layers are compressively stressed, having at least one inner compressively stressed layer, and wherein each layer of the laminate exhibits a state of stress opposite to that of the layers adjacent thereto. The laminate of my invention can assume many forms such as a sheet, a rod, a sphere, etc. In the case of a sheet or shapes made therefrom, the laminate can be considered to have at least five plies. These plies correspond to the layers described above. Thus, a crack resulting from the fracture of one of the outer plies will propagate through that outer ply and the adjacent tensilely stressed ply. However, the crack will not propagate through the next inner compressively stressed ply, and thus the integrity of the body is preserved even though an outer surface has been fractured. The body can, therefore, be said to have subsurface fortification.

I have found that the laminate of this invention must be formed at elevated temperatures so as to obtain intimate bonding, or fusion, of the various layers. The formation at elevated temperatures is advantageous in that the glass surfaces when fused are virgin or defect free. These glasses have not been handled and are fluid so that any surface defects will heal. Thus, the surfaces have not been mechanically degraded. At the lamination temperature, the viscosities of the various layers must bear a particular relation to each other. The core portion, which is usually the thickest portion of the body and tensilely stressed, should be between 1 and 6 times as viscous as the outer layers. Any intermediate layer desirably should have a viscosity equivalent to or between that of the core and outer layer. In order that the laminate be appreciably strengthened and the proper stress distribution be obtained, the coefficient of thermal expansion of the compressively stressed layers must be at least $5 \times 10^{-7}/°$ C. less than that of the adjacent tensilely stressed layers at the setting point of the softer of the compressively stressed and adjacent layers. This difference will approximately double the abraded strength of the body. Furthermore, the ratio of the thickness of the core layer to the thickness of each subsurface fortification layer should be between 10:1 and 400:1. The ratio of the total thickness of all tensilely stressed layers to the total thickness of all compressively stressed layers should be between 5:1–50:1. The thicknesses referred to are those measured when the body is viewed in cross-section.

BRIEF DESCRIPTION OF THE DRAWINGS

FIG. 1 is a cross-sectional view of a five-ply laminate and a representation of the stress distribution therein indicating the stress in the various plies.

FIG. 2 is a cross-sectional view of a seven-ply laminate and a representation of the stress distribution therein indicating the stress in the various plies.

DESCRIPTION OF THE PREFERRED EMBODIMENT

I have found that laminated articles made in accordance with my invention derive many of their beneficial properties from a unique stress distribution which can be obtained only in a laminated body. FIG. 1 shows the stress distribution in a five-ply body while FIG. 2 shows the distribution in a seven-ply body. In general, the distributions can be characterized as rectilinear; that is, the compressively stressed plies always experience about maximum compression while the tensilely stressed plies always experience about maximum tension. Hence, it is seen that within any ply there is little, if any, stress gradient. In this manner, very high compressive stresses can be introduced into the body while the magnitude of the internal tensile stresses is relatively low. For example, the ratio of maximum compression to maximum tension can be between 5:1 and 50:1 for most cases, but when necessary may be outside that range. These ratios depend upon the physical properties of the glasses used and the relative thicknesses of the plies.

In my invention, if an outer compressively stressed ply were fractured, the crack would propagate through that ply and depending upon the magnitude of the load, through the adjacent tensilely stressed ply. However, since the next ply is compressively stressed and has not been fractured, the crack will not propagate therethrough. Thus, the integrity of the body is preserved. The crack might stop propagating or it may change direction. If the crack changed directions it might run along the interface of the fractured ply and the inner compressively stressed ply or the crack might even return to the surface. In a five-ply laminated body 10, as shown in FIG. 1, a crack might propagate through plies 11 and 12 but would be stopped by ply 13. Thus, the main portion of the body, plies 13, 14, and 15 would remain intact. However, if ply 15 were fractured, the main portion would fracture but plies 11, 12, and 13 would remain in tact. Such a five-ply laminate would be useful where surface damage could be expected only on one side of laminate. However, if surface damage could occur on either side, a seven-ply laminate 20, as shown in FIG. 2, could be used. Thus, fracture of the outer plies 21 or 27 could be stopped by plies 23 or 25 respectively. Hence, the major portion of the body, plies 23, 24, and 25 would remain intact. Any number of inner compressively stressed plies may be used but the problems of manufacture and cost may set a practical maximum number of plies and inner compressively stressed plies. As shown in FIGS. 1 and 2, there will normally be a thick tensilely stressed core ply (14 and 24 respectively) which is to be protected. I have found that the ratio between the thickness of the core ply and each inner compressively stressed ply should be between 10:1 and 400:1. Furthermore, each inner compressively stressed ply should be at least .0005 inch thick. However, if the sheet, after fabrication, is redrawn, the inner layer could be .0001 inch thick or less. However, each outer compressively stressed ply should be at least .002 inch thick so that it is resistant to mechanical damage.

In my laminated system, the violence of breakage is controllable. The violence of breakage is related to the total tensile strain energy in the body which is in turn related, to some extent, to the maximum tensile stress. The laminate of my invention may have a relatively low maximum tensile stress and, therefore, a relatively low violence of breakage. However, if it is so desired, high internal tensile stresses can be created so that fine dicing upon fracture can be obtained.

One factor in determining the stress in a laminate is the amount of strain therein. The strain is initiated at the lowest setting point of each ply and the plies adjacent thereto. The setting point of glass and glass-ceramic materials is defined as a temperature 5° C. above the strain point. The stress in the body can then be calculated using, among other things, the strain. Rather than actually measuring the strain, a good approximation thereof is the difference in the coefficients of thermal expansion of the plies, as measured from 25 to 300° C., multiplied by the temperature differential from the lowest setting point to the use temperature. Another way of viewing this is that there must be at least some minimum difference in expansion coefficients at the setting point. In a glass or glass and glass-ceramic laminate, the coefficient of thermal expansion of a compressively stressed ply must be at least $15 \times 10^{-7}/°$ C. less than that of the adjacent tensilely stressed plies. However, in an all glass-ceramic laminate, wherein by the nature of the materials the lowest setting point is several hundred degrees higher than glass, the compressively stressed ply can have an expansion about $5 \times 10^{-7}/°$ C. less than the adjacent plies. The choice of actual expansions will depend upon the particular use of the laminate; however, the aforementioned minimum differences must be maintained.

I have found that I can produce bodies having a flexural strength, as measured in terms of Modulus of Rupture, of at least 15,000 p.s.i. This strength is the minimum which is necessary for the body to resist severe mechanical impacts.

Another important factor in determining the stress in a laminated body is the ratio of the total thickness of the tensilely stressed plies to the total thickness of the compressively stressed plies. In order to maintain the desired stresses, the ratio should be between 5:1–50:1.

The laminate of this invention may be used for many different products. For example, light weight tableware may be produced using this laminate or automobile windshields may also be produced. In windshields, one of the main problems has been the fracturing of the windshield as a result of stones and other missles which are thrown up from the road by other vehicles. Using the laminate of this invention, the stone might fracture the outer compressively stressed ply and the crack would then propagate through the adjacent tensilely stressed ply but would not propagate through the inner compressively stressed fortification ply, and thus the integrity of the windshield would be preserved. This is similar to what could happen in tableware.

Another feature of my invention is that if one of the tensilely stressed plies should fail due to delayed breakage, the body would still remain intact. A further advantage of this lamination system is that high-strength light-weight bodies can be produced since the strength level is high without a large cross section. Thus, the sub-surface fortification which is provided by this invention is very valuable in that it creates a body which prevents propagation of cracks from external sources or abuse. This should be contrasted with the three-ply laminate and other strengthening systems of the prior art which would fail completely upon fracture of the compressively stressed surface or the tensilely stressed core portion.

The bodies of the preferred body are fabricated by combining, in the fluid state, separate sheets of glass of the desired thickness and composition so as to form a laminated sheet, shaping the laminated sheet and then forming or cutting out the desired shape. The inner plies may be exposed along the cut edge during the cutting step; this exposure is not preferred since a stronger body can be produced when the inner plies are completely enveloped by the adjacent outer plies. By appropriately designed cutters, exposure of the inner plies can be minimized; furthermore, other secondary operations can completely envelop the inner plies.

In order to form the laminated sheet, it is necessary that at the moment of lamination, the viscosity of the various plies bear a particular relationship to each other. At the laminating temperature, the thicker tensilely stressed core ply should have a viscosity 1 to 6 times that of the outer compressively stressed layers. Preferably, the viscosity ratio should be from 2:1 and 4:1. The viscosity of the plies between the core ply and outer compressively stressed plies should have a value equivalent to or between the viscosity of the core and outer plies. Normally, during the laminating operation core and skin glasses are maintained at about the same temperature while maintaining the desired viscosity relationships. The selection of the absolute viscosities is related to the particular laminate forming technique used. For example, if an updraw or downdraw process were used or shapes other than a sheet were made, a different set of absolute viscosities would be selected; however, the relationship between the viscosity of the various plies should remain the same.

The liquidus temperature of the various plies should be lower than the lamination temperature so as to avoid devitrification during lamination.

It may be desirable to heat treat the laminated body formed by the aforementioned process. In order to heat treat the body without formers and yet maintain its shape, the viscosity of the outer plies at the heat treating temperature should be greater than that of the inner plies. The higher viscosity outer layers tend to retain the more fluid inner layers. In order to achieve the higher viscosity, it is necessary that at some temperature above the maximum heat treating temperature there be a reversal of the viscosity relationship, for the various plies. Deformation of the outer layer can also result from the contact between it and the lehr belt which carries the body through the heat treating furnace. If the outer layer has an annealing point greater than 600° C., this deformation can be minimized.

The glasses which may be used in this invention can be transparent, opacifiable, or thermally crystallizable. The compositions of the various glasses which may be used are disclosed in copending application, Ser. No. 735,074, filed concurrently herewith, entitled "Laminated Bodies," now Pat. No. 3,673,049. Various combinations of these glasses may be used to achieve the desired properties.

The following examples will better illustrate the laminates of my invention:

EXAMPLE I

Three separate laminae of glass of the following composition can be formed: 57.7% $SiO_2$, 14.94% $Al_2O_3$, 9.90% CaO, 6.87% MgO, 3.98% $B_2O_3$, 5.98% BaO, and 0.5% As$_2$O$_3$. Two of the laminae can be .002 inch thick and the remaining lamina can be .001 inch thick. Two more separate laminae of a glass of the following composition can be also formed: 56.84% SiO$_2$, 19.80% Al$_2$O$_3$, 12.80% Na$_2$O, 3.18% CaO, 4.30% K$_2$O, 2.11% MgO, and 0.99% As$_2$O$_3$. One of these laminae can be .075 inch thick and the other can be .007 inch thick. All the laminae can be laminated at about 1300° C. so as to form a five ply laminated sheet. The laminate would have the following structure: the first ply .002 inch thick, the second .007 inch thick, the third ply .001 inch thick, the fourth .075 inch thick, and the fifth .002 inch thick. The total thickness of the laminate would thus be about .087 inch. At the laminating temperature, the viscosity of the compressively stressed first, third, and fifth plies would be about 1000 poises while the viscosity of the tensilely stressed second and fourth plies would be about 4800 poises. The liquidus of both glasses would be below 1300° C. with the liquidus of the compressively stressed plies being 1144° C. and that of the tensilely stressed plies being 1047° C. The coefficient of thermal expansion of the compressively stressed plies can be 46×10$^{-7}$/° C. while that of the tensilely stressed plies can be 94×10$^{-7}$/° C. This body would be used where impact or damage would normally occur on one side of the body.

EXAMPLE II

Three separate laminae of glass of the following composition can be formed: 56.70% SiO$_2$, 14.85% Al$_2$O$_3$, 11.92% CaO, 8.57% MgO, and 7.90% B$_2$O$_3$. Two of the sheets can be .002 inch thick and the remaining sheet can be .001 inch thick. Three separate sheets of an opacifiable glass of the following composition can also be formed: 59.80% SiO$_2$, 18.35% Al$_2$O$_3$, 10.80% Na$_2$O, 1.05% CaO, 0.40% MgO, 7.40% ZnO, 3.80% F, and 0.35% B$_2$O$_3$. One of these sheets can be .075 inch thick and the other can be .007 inch thick. All the sheets would be laminated at about 1280° C. so as to form a five ply laminated sheet. Thus the laminate would be the following structure: the first play would be .002 inch thick, the second ply would be .007 inch thick, the third ply would be .001 inch thick, the fourth ply would be .075 inch thick, and the fifth ply would be .002 inch thick. Hence the total thickness of the laminate would be about .087 inch. At the laminating temperature the viscosity of the compressively stressed first, third, and fifth plies would be about 470 poises while the viscosity of the tensilely stressed second and fourth plies would be about 2200 poises. The liquidus temperatures of both glasses would be below 1280° C. with the liquidus of the compressively stressed plies being about 1126° C. and that of the tensilely stressed plies being 1166° C. The coefficient of thermal expansion of the compressively stressed plies would be 47×10$^{-7}$/° C. while that of the tensilely stressed plies would be 70×10$^{-7}$/° C. The laminate can then be heat treated, without formers so as to produce a dense opacified body.

EXAMPLE III

Four separate laminae of glass of the following composition can be formed: 62.2% SiO$_2$, 14.8% Al$_2$O$_3$, and 23.0% CaO. Two of the sheets would be .002 inch thick and the remaining two would be .001 inch thick. Three separate sheets of a thermally-crystallizable body glass of the following composition can also be formed: 52.15% SiO$_2$, 0.35% As$_2$O$_3$, 26.15% Al$_2$O$_3$, 10.30% Na$_2$O, 6.60% CaO, 3.00% TiO$_2$, 0.95% MgO, and 0.50% Li$_2$O. One of these sheets could be .080 inch thick and the other two could each be .007 inch thick. All the sheets can be laminated together at about 1300° C. so as to form a seven ply laminated sheet. The laminated sheet can have the following structure: the first ply would be .002 inch thick, the second ply would be .007 inch thick, the third ply would be .001 inch thick, the fourth ply would be .080 inch thick, the fifth ply would be .001 inch thick, the sixth ply would be .007 inch thick, and the seventh ply would be .002 inch thick. The total thickness of the laminate would be .100 inch. At the laminating temperature, the viscosity of the compressively stressed first, third, fifth, and seventh ply would be about 1400 poises while the viscosity of the tensilely stressed second, fourth, and sixth plies would be about 2800 poises. The liquidus temperature of both glasses would be below 1300° C. with the liquidus of the compressively stressed plies being 1139° C. and that of the tensilely stressed plies being 1224° C. The coefficient of thermal expansion of the compressively stressed plies would be 54×10$^{-7}$/° C. with the expansion of the thermally crystallizable tensilely stressed plies being 70×10$^{-7}$/° C. The laminate could then be heat treated, without formers, so as to convert the thermally-crystallizable glass to a glass-ceramic. The resultant glass-ceramic can be characterized as a titania-nucleated nepheline-type glass-ceramic, and having a coefficient of thermal expansion of 97×10$^{-7}$/° C.

I claim:
1. A method for continuously hot-forming a sound subsurface fortified laminated glass article composed of at least five fused adjacent layers wherein:
   (1) each layer exhibits a state of stress opposite to that of each layer adjacent thereto;
   (2) the outermost layer is in a state of compression; and
   (3) the coefficient of thermal expansion of a compressively-stressed layer is at least about 15×10$^{-7}$/° C. less than the coefficient of thermal expansion of an adjacent tensilely-stressed layer at the setting point;
which comprises the steps of:
   (a) melting a glass forming batch for each layer,
   (b) essentially simultaneously bringing said molten batches together while in the fluid state and combining them into a laminated glass article at an elevated temperautre such that each of said tensilely-stressed layers has a viscosity greater than and up to six times greater than each of said adjacent compressively-stressed layers; and
   (c) fusing said layers together such that an interface therebetween is essentially defect-free.
2. The method as recited in claim 1 wherein
   (a) the viscosity of the core layer is 2 to 4 times greater than the viscosity of the outer layers, and
   (b) the viscosity of the core layer is 2 to 4 times greater than the viscosity of the layers intermediate the core layer and the outer layer.

References Cited
UNITED STATES PATENTS

| | | | |
|---|---|---|---|
| 2,313,296 | 3/1943 | Lamesch | 65—121 X |
| 3,218,143 | 11/1965 | Lajarte | 65—121 X |
| 3,275,428 | 9/1966 | Siegmund | 65—Dig. 7 |
| 3,259,479 | 7/1966 | Tiede | 65—121 X |
| 3,428,475 | 2/1969 | Teeg | 65—121 X |
| 3,614,197 | 10/1971 | Nishizawa | 65—Dig. 7 |

FRANK W. MIGA, Primary Examiner

U.S. Cl. X.R.

65—145, 3